US007299469B2

(12) United States Patent
Hamilton, II et al.

(10) Patent No.: US 7,299,469 B2
(45) Date of Patent: Nov. 20, 2007

(54) HIERARCHICAL WEIGHTING OF DONOR AND RECIPIENT POOLS FOR OPTIMAL REALLOCATION IN LOGICALLY PARTITIONED COMPUTER SYSTEMS

(75) Inventors: Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 10/427,100

(22) Filed: Apr. 30, 2003

(65) Prior Publication Data

US 2004/0230974 A1 Nov. 18, 2004

(51) Int. Cl.
*G06F 9/46* (2006.01)
(52) U.S. Cl. .................................................. 718/104
(58) Field of Classification Search ............... 718/104; 711/171, 173; 710/56
See application file for complete search history.

(56) References Cited

U.S. PATENT DOCUMENTS

| | | | |
|---|---|---|---|
| 4,603,382 A | 7/1986 | Cole et al. ................... | 364/200 |
| 5,504,670 A | 4/1996 | Barth et al. .................. | 364/134 |
| 5,875,464 A | 2/1999 | Kirk ........................... | 711/129 |
| 5,889,989 A | 3/1999 | Robertazzi et al. ......... | 395/675 |
| 5,978,583 A | 11/1999 | Ekanadham et al. ........ | 395/703 |
| 6,199,075 B1 | 3/2001 | Ungar et al. ................. | 707/206 |
| 6,321,373 B1 | 11/2001 | Ekanadham et al. ........... | 717/1 |
| 6,327,587 B1 | 12/2001 | Forster .......................... | 707/2 |
| 6,366,945 B1 | 4/2002 | Fong et al. ................. | 709/104 |
| 6,378,039 B1 | 4/2002 | Obara et al. ................ | 711/114 |
| 6,694,419 B1 * | 2/2004 | Schnee et al. .............. | 711/173 |
| 6,968,441 B1 * | 11/2005 | Schnee ........................ | 711/173 |
| 7,003,597 B2 * | 2/2006 | Georgiou et al. ............. | 710/56 |
| 2002/0178337 A1 | 11/2002 | Wilson et al. .............. | 711/173 |
| 2003/0005215 A1 | 1/2003 | Arimilli et al. ............. | 711/105 |
| 2004/0078541 A1 * | 4/2004 | Lightstone et al. ......... | 711/171 |

* cited by examiner

*Primary Examiner*—Meng-Al T. An
*Assistant Examiner*—Eric C Wai
(74) *Attorney, Agent, or Firm*—David A. Mims, Jr.; Rudolf O. Siegesmund; Gordon & Rees, LLP

(57) ABSTRACT

A method and system for reallocating resources in a logically partitioned environment using hierarchical weighting comprising a Performance Enhancement Program (PEP), a Reallocation Program (RP), and a Hierarchical Weighting Program (HWP). The PEP allows an administrator to designate several performance parameters and rank the priority of the resources. The RP compiles the performance data for the resources and calculates a composite parameter, a recipient workload ratio, and a donor workload ratio. The RP determines the donors and recipients. RP allocates the resources from the donors to the recipients using the HWP. The HWP evaluates and ranks the equivalency of donors and recipients based on the noise factor. HWP then reallocates the resource in each class and subclass from the highest ranked donor to the highest ranked recipient. The RP continues to monitor and update the workload statistics based on either a moving window or a discrete window sampling system.

35 Claims, 5 Drawing Sheets

HIERARCHICAL WEIGHTING OF DONOR AND RECIPIENT POOLS FOR OPTIMAL REALLOCATION IN LOGICALLY PARTITIONED COMPUTER SYSTEMS

FIELD OF THE INVENTION

The present invention is related generally to a method for increasing computer system efficiency and specifically to a computer program for reallocating resources amongst virtual systems.

BACKGROUND OF THE INVENTION

A computer system is a collection of computer resources, such as processors, adapters, memory and the like, which work together to perform a specific task, and is well known in the art. The computer systems may be located in a single computer, such as a server, or in a plurality of computers, such as computer network. System administrators (hereinafter, administrators) are people who setup and manage computer systems. One of the tools used by administrators to increase the performance of a computer system is physical partitioning. Administrators physically partition a managed system by dedicating buses and predefined physical modules within the system to assist in creating the smaller partitioned systems, referred to as virtual systems. Each virtual system in a managed system appears to the end user as a completely separate system. In addition, virtual systems improve administrative flexibility and application performance.

Another method used by administrators to increase system performance is logical partitioning. Logical partitioning is a process which creates logical partitions within the managed system. Logical partitioning is distinct from physical partitioning in that there are no physically separated buses, memory, or processors in a logically partitioned system. Instead, the virtual systems are separated only by the system software. Similar to the physically partitioned system, each individual virtual system created by logical partitioning appears to the end user as a completely separate system. One advantage of logical partitioning is that logical partitioning permits much finer granularity in virtual system creation, such that any processor, memory, or adapter may be easily added or removed from a virtual system. Logical partitioning is generally controlled by a hardware management console outside of the managed system. The hardware management console controls the division of the managed system into the virtual systems and, if necessary, the reallocation of resources amongst the various virtual systems.

Recently, administrators have been able to move system hardware resources within the managed system with increased flexibility. When the reallocation occurs without having to reboot the managed system, the logical partitioning is known as dynamic logical partitioning. The prior art methods of dynamic reallocation require the system administrator to recognize the need for reallocation, and then manually reallocate the resources. For example, in a system comprising a first logical partition having eight central processing units (CPUs) and a second logical partition having eight CPUs, the system administrator may observe that during a peak processing period, the first logical partition is running at 100% CPU utilization and the second logical partition is running at 20% CPU utilization. Upon observing the disparity in CPU utilization, the administrator may manually move one or more resources from the second logical partition to the first logical partition to improve system performance during the peak processing period.

Therefore, a need exists for a system and method to automate the control and movement of resources in a dynamic logical partitioning environment.

Another problem encountered by administrators is deciding which donors to take resources from and which recipients to give resources to. This is particularly a problem when there is only one donor and a plurality of recipients or there is only one recipient and a plurality of donors. Therefore, a need exists for a method of determining which logical partition to remove resources from, and which logical partition to reallocate resources to.

The need for automation within the reallocation process has been addressed by the prior art. U.S. Pat. No. 4,603,382 (the '382 patent) entitled "Dynamic Buffer Reallocation" discloses a method for dynamically reallocating data storage segments within a storage device. The '382 patent monitors the properties of the data storage device and reallocates the buffer segments when they exceed a predefined threshold. U.S. Pat. No. 5,875,464 (the '464 patent) entitled "Computer System with Private and Shared Partitions in Cache" discloses a partitioned cache memory buffer which monitors the allocation of tasks. The memory buffer of the '464 patent reallocates the tasks when necessary. U.S. Pat. No. 5,978,583 (the '583 patent) discloses a method of reallocating applications during the course of their execution. The method disclosed in the '583 patent monitors the applications and redistributes the applications when necessary based on various criteria. U.S. Pat. No. 6,366,945 (the '945 patent) entitled "Flexible Dynamic Partitioning of Resources in a Cluster Computing Environment" discloses a method for dynamic partitioning of a computer network. The method of the '945 patent monitors the resources within the virtual networks and moves resources among networks when required. However, the '945 patent is limited in that it does not disclose a method for dynamic logical partitioning of a managed network. Consequently, what is needed beyond the '382, '464, '583, and '945 patents is a method and system for dynamic logical partitioning of a managed system. Furthermore, a need exists for a method and system for reallocating resources among the computers within a virtual system. Finally, a need exists for an efficient method of allocating resources based on the ability of the donor systems to donate resources and the need of the recipient system to receive resources.

SUMMARY OF THE INVENTION

The present invention, which meets the needs stated above, is a method and system for reallocating resources in a logically partitioned environment using hierarchical weighting. The software embodiment of the present invention comprises a Performance Enhancement Program (PEP), a Reallocation Program (RP), and a Hierarchical Weighting Program (HWP). The PEP allows an administrator to designate a performance parameter, a capture interval, a sampling interval, a donor candidate pool, a recipient candidate pool, a donor load threshold, a recipient load threshold, a noise ratio, and rank the priority of the resources. The RP compiles the performance data for the resources and calculates a composite parameter, a recipient workload ratio, and a donor workload ratio. For each resource in the donor candidate pool, the RP marks the resource as a donor if the donor workload ratio is less than one. For each resource in the recipient candidate pool, the RP marks the resource as a recipient if the recipient workload ratio is greater than one. RP then determines if resource reallocation is necessary. If reallocation is necessary, RP allocates the resources from the donors to the recipients using the HWP. The HWP evaluates the equivalency of donors and recipients based on the noise factor. Donors and recipients that are not equivalent are ranked according to their workload ratios. Equivalent donors and recipients are ranked according to the priority of their resources. HWP then reallocates the resource in each class and subclass from the highest ranked donor to the highest ranked recipient. The RP continues to monitor and update the workload statistics based on either a moving window or a discrete window sampling system. The partitioned system of the present invention does not require a reboot to reallocate resources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
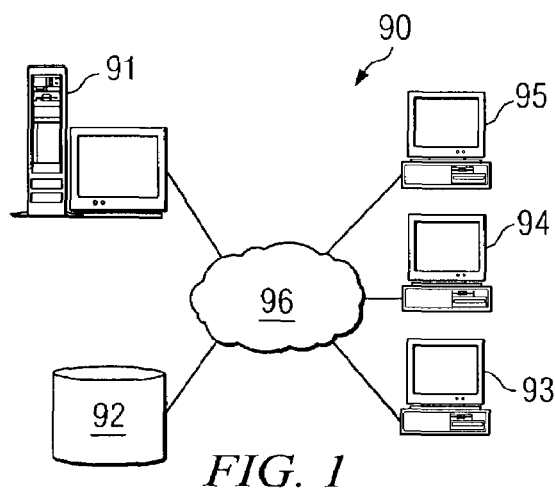
FIG. 1 is an illustration of a computer network used to implement the present invention.

As used herein the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "managed system" means a collection of hardware resources which work together to accomplish a specific task. The resources may be located in a single computer or in a plurality of networked computers.

As used herein, the term "resource" means a hardware component of a computer. Examples of resources are processors, adapters, and memory.

As used herein, the term "performance parameter" means one or more parameters used to measure the workload on a resource. Performance parameters may include a combination of several individual performance parameters.

As used herein, the term "donor candidate" means a system which is designated by a user as eligible to donate a resource to another system. The group of all donor candidates is referred to as the donor candidate pool. A donor candidate will become a donor if the system's composite parameter is less than the donor load threshold.

As used herein, the term "donor" means a system which has a composite parameter less than the donor load threshold. The group of all donors is referred to as a donor pool.

As used herein, the term "recipient candidate" means a system which is designated by a user as eligible to receive a resource from another system. The group of all recipient candidates is referred to as the recipient candidate pool. A recipient candidate will become a recipient if the system's composite parameter is greater than the recipient load threshold.

As used herein, the term "recipient" means a system which has a composite parameter greater than the recipient load threshold. The group of all recipients is referred to as a recipient pool.

As used herein, the term "donor load threshold" means a specific performance parameter level below which a donor may provide a resource to a recipient.

As used herein, the term "recipient load threshold" means a specific performance parameter level above which a recipient may receive a resource from a donor.

As used herein, the term "conditioning interval" means the period during which no resource reallocation will transpire. Sampling statistics may or may not be collected during this period, but no action will be taken upon these statistics until completion of the conditioning interval.

As used herein, the term "capture interval" means the interval at which statistics are collected on resource performance for various systems. The capture interval is any interval shorter than or equal to the sampling interval.

As used herein, the term "sampling interval" means the window of time over which sample statistics are captured. The sampling interval is equal to or greater than the capture interval. For example, statistics might be captured every five seconds for a five minute sampling interval. In that case, sixty statistical samples would be available at the end of the sampling interval. The sampling interval can be implemented as either a moving window or a discrete window.

As used herein, the term "moving window" means that, for each new performance parameter value which is added to the collection of samples, the oldest performance parameter value, formerly within the sampling interval, falls out of consideration. The advantage of using a moving window, vis-à-vis a discrete window, is that the moving window provides greater responsiveness in providing resources when and where they are needed. The use of a moving window normally requires computation of the composite parameter once for each sample taken.

As used herein, the term "discrete window" means that the sampling window is reset on a regular basis and those samples are considered in individual, non-overlapping time periods. The advantage of using a discrete window, vis-à-vis a moving window, is that the discrete window requires fewer processing resources because the composite parameter is only calculated once per sampling interval.

As used herein, the term "composite parameter" means the average of the resource data accumulated over the sampling interval. The average used to calculate the composite parameter may be the mean, median, mode, or norm. Smoothing criteria may optionally be used to determine the composite parameter. An example of smoothing would be removing the high and low values of the data collected during the sampling interval.

As used herein, the term "donor workload ratio" is equal to the composite parameter divided by the donor load threshold. The donor workload ratio measures the extent to which the composite parameter exceeds or falls below the donor load threshold.

As used herein, the term "recipient workload ratio" is equal to the composite parameter divided by the recipient load threshold. The recipient workload ratio measures the extent to which the composite parameter exceeds or falls below the recipient load threshold.

As used herein, the term "numerical application ranking" means a mechanism used to decide the more prioritized of two systems when the two systems' other parameters are considered equivalent.

As used herein, the term "noise factor" means a value used to determine the equivalency of two donors or recipients. If the difference between the donor workload ratios of any two donors is less than the noise factor, then the two donors are considered equivalent donors. Similarly, if the difference between the recipient workload ratios of any two recipients is less than the noise factor, then the recipients are considered equivalent recipients. A high noise factor will make the resource ranking the governing criteria in reallocating resources. A low noise factor will make the donor and recipient workload ratios the governing criteria in reallocating resources.

As used herein, the term "resource class" means a specific type of resource. Examples of resource classes are processors, memory, and adapters. Persons skilled in the art are aware of other resource classes.

As used herein, the term "resource subclass" means a specific category of resource class. If the resource class is adapters, then examples of the resource subclasses would include: gigabit ethernet, 10/100 ethernet, fibre channel, ATM, and FDDI. Persons skilled in the art are aware of other resource subclasses.

As used herein, the term "controlling entity" means the computational device, either internal or external to the managed system, which manages the reallocation of resources. In a UNIX environment, this is known as the Hardware Management Console.

FIG. 1 is an illustration of computer network 90 associated with the present invention. Computer network 90 comprises local machine 95 electrically coupled to network 96. Local machine 95 is electrically coupled to remote machine 94 and remote machine 93 via network 96. Local machine 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network that may contain the present invention and is not meant as an architectural limitation.

Figure 2:
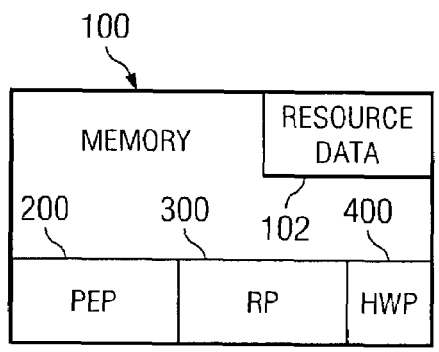
FIG. 2 is an illustration of the memory used to implement the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Performance Enhancement Program (PEP) 200. PEP 200 includes Reallocation Program (RP) 300 and Hierarchical Weighting Program (HWP) 400. PEP 200, RP 300, and HWP 400 described herein can be stored within the memory of any computer depicted in FIG. 1. Alternatively, PEP 200, RP 300, and HWP 400 can be stored in an external storage device such as a removable disk or a CD-ROM. Memory 100 is illustrative of the memory within one of the computers of FIG. 1. Memory 100 also contains resource data 102.

The present invention may interface with resource data 102 through memory 100. As part of the present invention, the memory 100 can be configured with PEP 200, RP 300, and/or HWP 400.

In alternative embodiments, PEP 200, RP 300, and/or HWP 400 can be stored in the memory of other computers. Storing PEP 200, RP 300, and/or HWP 400 in the memory of other computers allows the processor workload to be distributed across a plurality of processors instead of a single processor. Further configurations of PEP 200, RP 300, and/or HWP 400 across various memories are known by persons skilled in the art.

Figure 3:
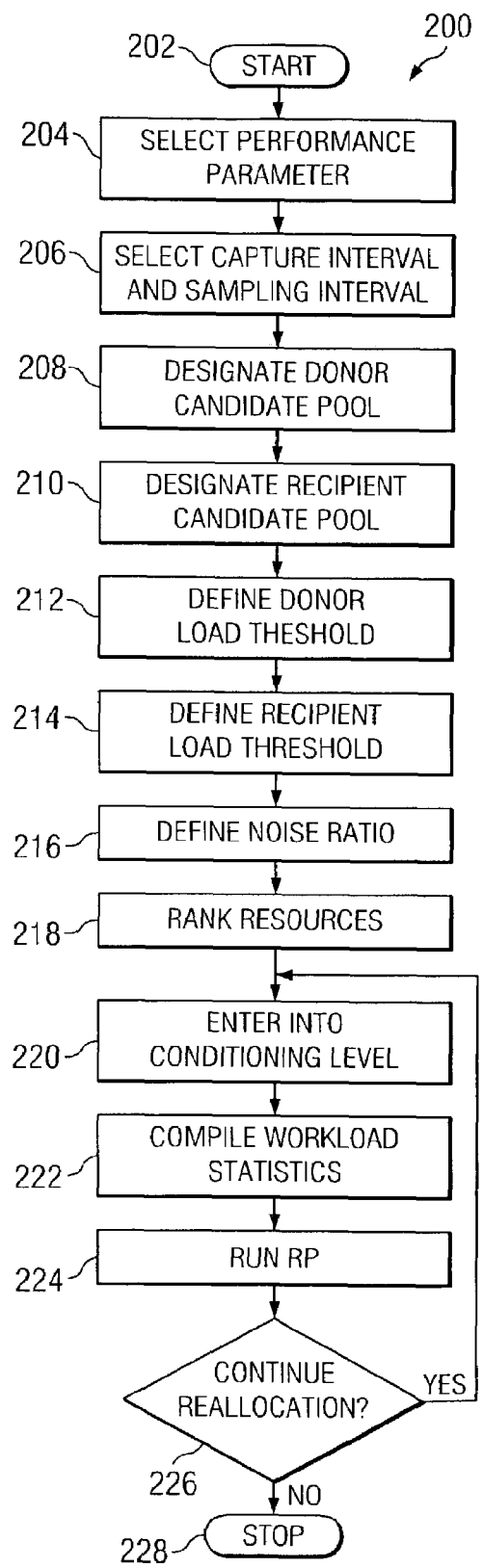
FIG. 3 is an illustration of the logic of the Performance Enhancement Program (PEP) of the present invention.

Turning to FIG. 3, a flowchart of the logic of PEP 200 is illustrated. PEP 200 is a program which allows the user to designate performance enhancement criteria. The user described herein may be, for example, a system administrator. PEP 200 starts (202) and the user selects at least one performance parameter (204). The performance parameter is used by RP 300 to measure the workload on the resources. The user then defines the capture interval and the sampling interval (206). The capture interval and the sampling interval are used by RP 300 to develop resource data for resource reallocation. The user then designates the donor candidate pool (208). In designating the donor candidate pool, the user selects the resources which are eligible to be donors. Donor candidates are generally computers or systems whose performance is of relatively low importance when compared to other computers or systems. Donor candidates may be either test or development computers or systems, or they could be applications of secondary criticality when compared with the criticality of the recipient candidates. Generally, all of the resources would be selected as potential donors unless the user wants to specifically exclude certain resources. The user then designates the recipient candidate pool (210). In designating the recipient candidate pool, the user selects the resources which are eligible to be recipients. Recipient candidates are computers or systems with relatively high priority or importance. Generally, all of the resources would be selected as potential recipients unless the user wants to specifically exclude certain resources.

The user then defines the donor load threshold (212). The donor load threshold is used by RP 300 to determine when a donor candidate becomes a donor. A heavily loaded donor will not donate resources unless its threshold value is set very high. The load threshold increases as system performance goes down, so that only a donor with a low load (i.e. relatively strong performance) may donate resources. The threshold may be set to provide whatever degree of flexibility is desired by the user. For example, if the resource is a processor, and the performance parameter is the run queue, the performance parameter limit might be set at three waiting items in the run queue. Thus, when a processor has less than three items in the run queue, the processor will be identified as a potential donor.

The user then defines the recipient load threshold (214). The recipient load threshold is used by RP 300 to determine when a recipient candidate becomes a recipient. A lightly loaded recipient will not receive resources unless its threshold value is set very low. As the load on the recipient system increases, the performance of the recipient system goes down, thus making the slow-running recipient candidate ripe for a resource addition. For example, if the resource is a processor, and the performance parameter is the run queue, the performance parameter limit might be set at four waiting items in the run queue. Thus, when a processor has more than four items in the run queue, the processor will be identified as a potential recipient. The user then defines the noise ratio (216). The noise ratio is used by HWP 400 to determine the equivalence of two donors or two recipients. The user then ranks the resources (218). In ranking the resources, the user looks at each class, and if necessary subclass, of resources and ranks the resources based on their importance. High priority resources receive a high ranking while low priority resources receive a low ranking. HWP 400 uses the resource ranking to rank the donors and recipients when two donors or two recipients are considered equivalent.

PEP 200 then enters into a conditioning level (220). During the conditioning level, the resource reallocation is temporarily suspended between the donors and the recipients. During the conditional period, PEP 200 optionally compiles the workload statistics for the resources in the donor pool and in the recipient pool (222). If the workload statistics are compiled, then there may be some overlap between the data in the workload statistics and the data in the sampling interval. PEP 200 then runs RP 300 (224). PEP 200 then makes a determination whether to continue the resource reallocation (226). If the user wants to continue resource reallocation, PEP 200 returns to step 220. If the user does not want to continue resource reallocation, PEP 200 ends (228).

Figure 4:
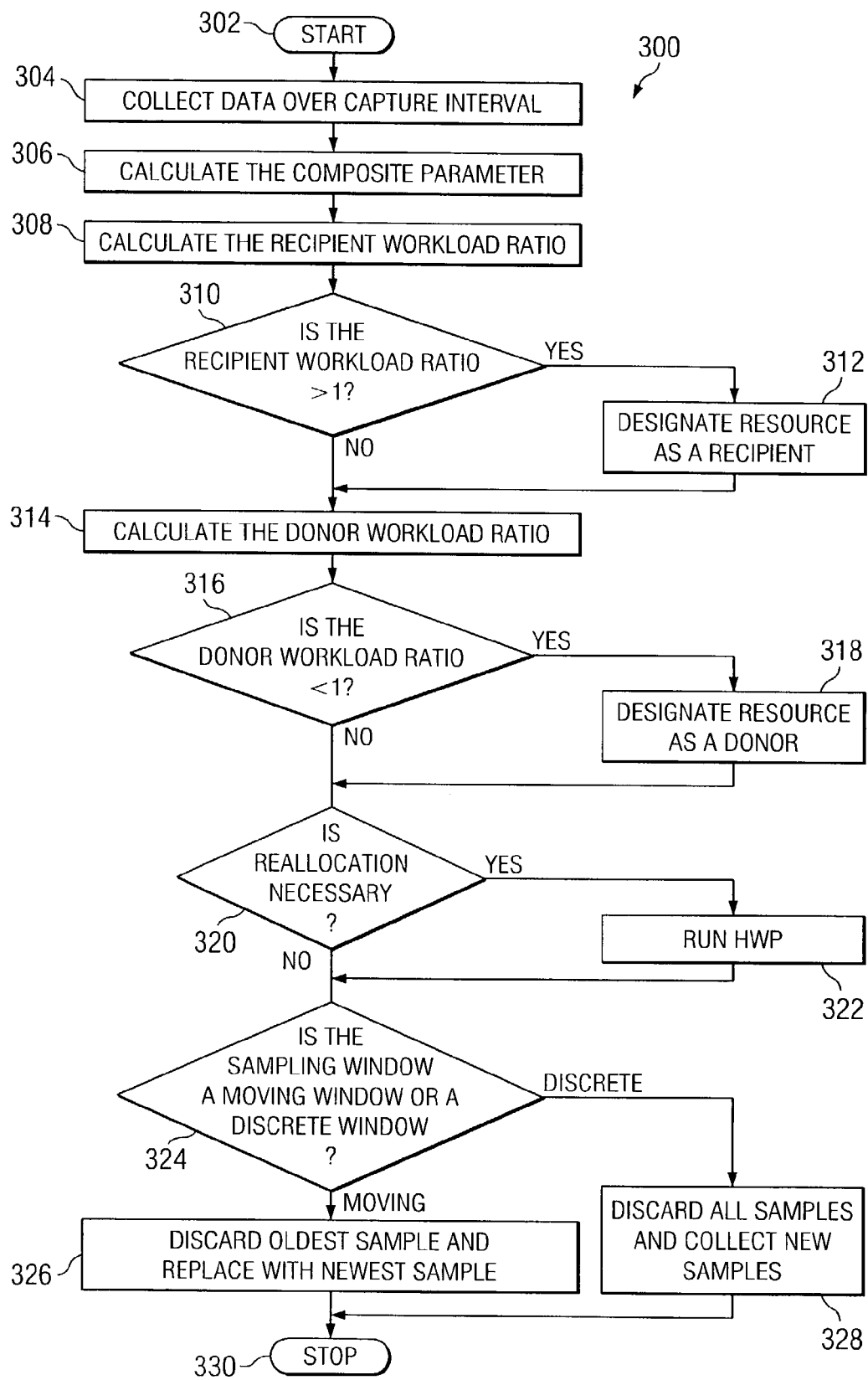
FIG. 4 is an illustration of the logic of the Reallocation Program (RP) of the present invention.

Turning to FIG. 4, a flowchart of the logic of RP 300 is illustrated. RP 300 is a program which reallocates the resources. RP 300 starts (302) when prompted by PEP 200. RP 300 collects samples of the resource data at the capture intervals over the sampling interval (304), saving the resource data to a cache memory or hard disk. For example, if the resource is a processor, the performance parameter is the run queue, the capture interval is five seconds, and the sampling interval is five minutes, then RP 300 records the number of items waiting in the run queue for each processor at the end of every fifth second for a total of five minutes. After the sampling interval has elapsed, RP 300 then calculates the composite parameter (306). RP 300 calculates the composite parameter by averaging the resource data.

RP 300 then calculates the recipient workload ratio for each recipient candidate (308). The recipient workload ratio is equal to the recipient candidate's composite parameter divided by the recipient load threshold. RP 300 then determines if the recipient workload ratio is greater than one (310). If the recipient workload ratio is not greater than one, then RP 300 proceeds to step 314. If the recipient workload ratio is greater than one, then RP 300 designates that resource as a recipient (312) and proceeds to step 314.

RP 300 then calculates the donor workload ratio for each donor candidate (314). The donor workload ratio is equal to the donor candidate's composite parameter divided by the donor load threshold. RP 300 then determines if the donor workload ratio is less than one (316). If the donor workload ratio is not less than one, then RP 300 proceeds to step 320. If the donor workload ratio is less than one, then RP 300 designates that resource as a donor (318) and proceeds to step 320.

RP 300 then makes a determination whether resource reallocation is necessary (320). RP 300 can optionally send the composite parameter to the controlling entity for the determination whether reallocation is necessary. Reallocation will be necessary if there is at least one donor and at least one recipient. If reallocation is not necessary, RP 300 proceeds to step 324. If reallocation is necessary, RP 300 runs HWP 400 (322). RP 300 then proceeds to step 324.

At step 324, RP 300 then makes a determination whether the sampling window is a moving window or a discrete window (324). If the sampling window is a moving window, RP 300 discards the oldest data sample and replaces the oldest data sample with the newest data sample (326). RP 300 then ends (330). If at step 324 the sampling window is a discrete window, RP 300 discards all of the data samples and collects new data samples (328). RP 300 then ends (330).

Figure 5:
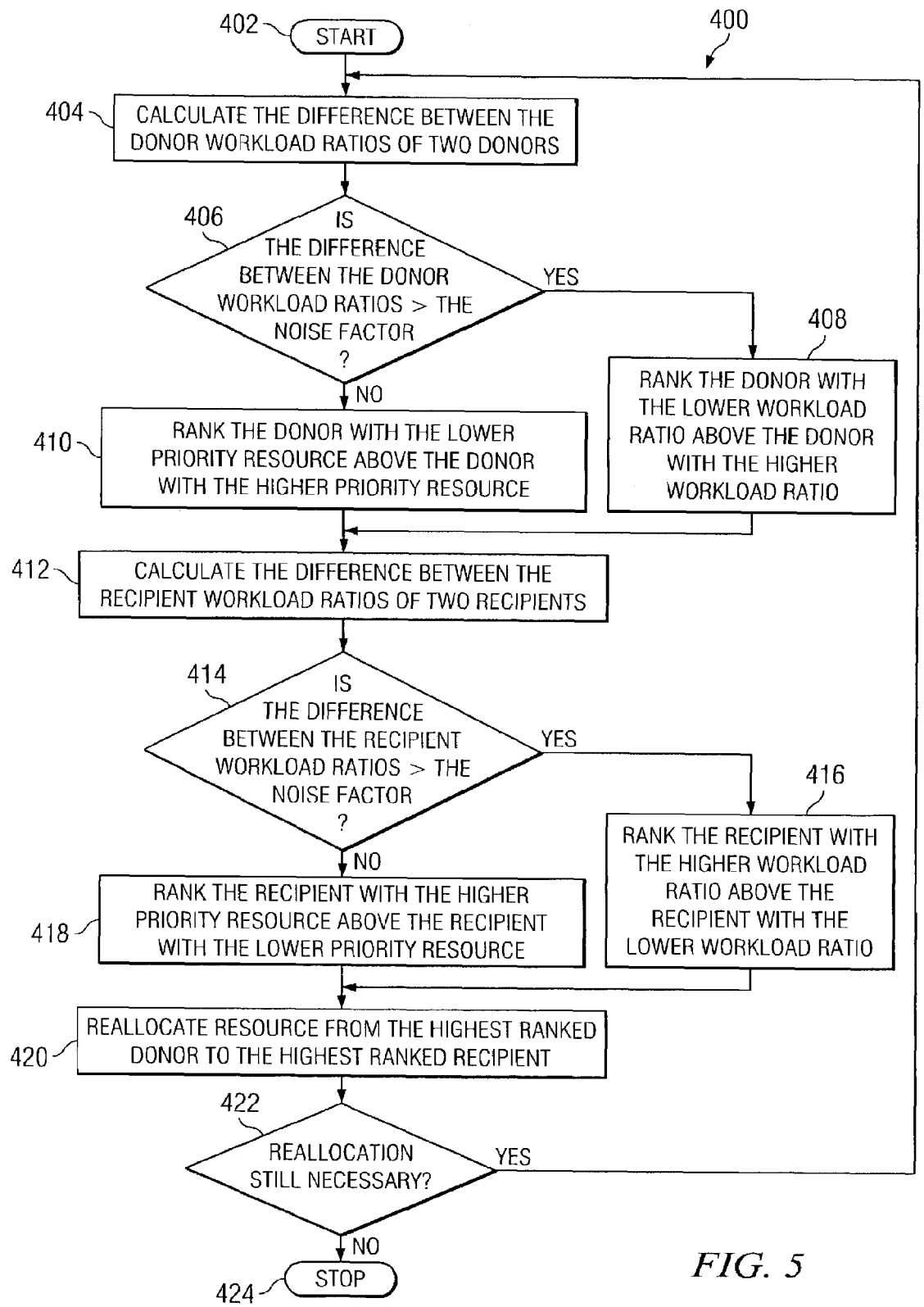
FIG. 5 is an illustration of the logic of the Hierarchical Weighting Program (HWP) of the present invention.

Turning to FIG. 5, a flowchart of the logic of HWP 400 is illustrated. HWP 400 is a program which weighs and ranks the ability for donors to donate resources and the need recipients have for resources. HWP 400 starts (402) when prompted by RP 300. HWP 400 then calculates the difference between the donor workload ratios for two donors (404). HWP 400 then determines if the difference between the donor workload ratios between the two donors is greater than the noise factor (406). If the difference between the donor workload ratios is greater than the noise factor, HWP 400 ranks the donor with the lower workload ratio above the donor with the higher workload ratio (408) and proceeds to step 412. If at step 406 the difference between the donor workload ratios is not greater than the noise factor, then HWP 400 ranks the donor with the lower priority resource above the donor with the higher priority resource (410) and proceeds to step 412. Resource priority was specified by the user in step 218 of PEP 200. HWP 400 can repeat steps 404 through 412 as many times as necessary to create a ranked list of donors within each resource class, and if necessary, subclass within the managed system.

HWP 400 then calculates the difference between the recipient workload ratios for two recipients (412). HWP 400 then determines if the difference between the recipient workload ratios between the two recipients is greater than the noise factor (414). If the difference between the recipient workload ratios is greater than the noise factor, HWP 400 ranks the recipient with the higher workload ratio above the recipient with the lower workload ratio (416) and proceeds to step 420. If at step 414 the difference between the recipient workload ratios is not greater than the noise factor, then HWP 400 ranks the recipient with the lower priority resource above the recipient with the higher priority resource (418) and proceeds to step 420. Resource priority was specified by the user in step 218 of PEP 200. HWP 400 can repeat steps 412 through 420 as many times as necessary to create a ranked list of recipients within each resource class, and if necessary, subclass within the managed system.

HWP 400 then reallocates the resource from the highest ranked donor to the highest ranked recipient (420). When the resource has been reallocated, HWP 400 removes the donor from the donor ranking list and removes the recipient from the recipient ranking list. HWP 400 performs step 420 for each resource class, and if necessary subclass, within the managed system. HWP 400 then determines if reallocation is still necessary (422). Reallocation will be necessary if there are both donors and recipients remaining in any resource class or subclass. If reallocation is necessary, HWP 400 returns to step 404. If reallocation is not necessary, then HWP 400 ends (424).

Figure 6:
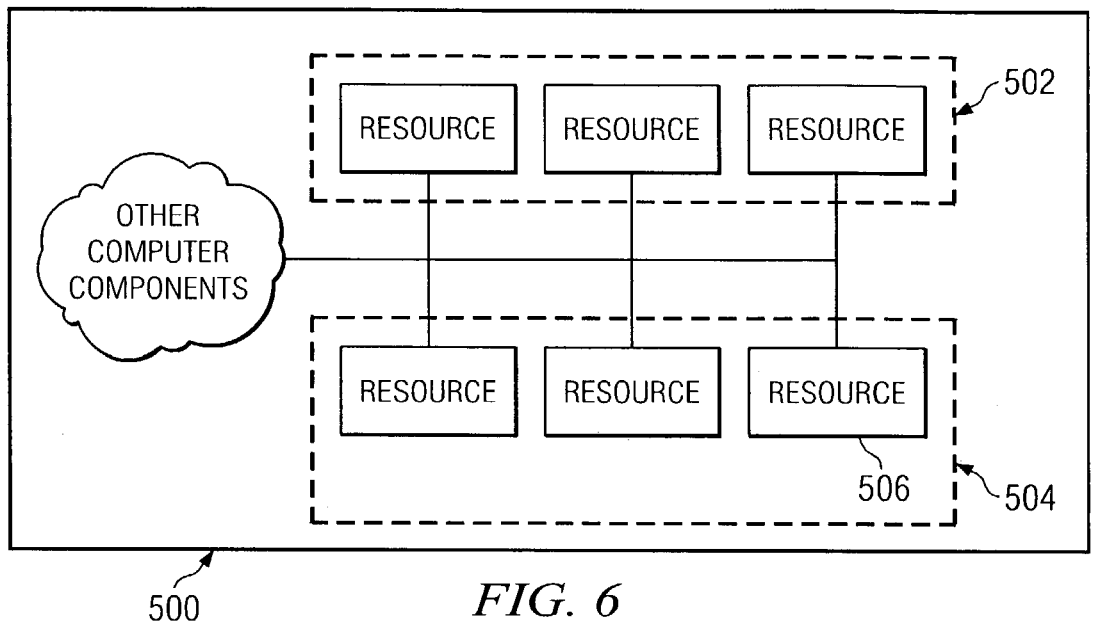
FIG. 6 is an illustration of a logically partitioned system in a single computer before application of the present invention.

PEP 200 and/or RP 300 may be implemented on a managed system which is a single computer, such as a server with a plurality of resources. Turning to FIG. 6, server 500 comprises six resources electrically coupled to other computer components. Persons skilled in the art are aware of the composition of other computer components which may be, for example, processors, adapters, random access memory (RAM), read only memory (ROM), devices, device controllers, hard disk drives, floppy disk drives, CD-ROM drives, DVD drives, system connections, system controllers, I/O ports, monitors, user input devices, and the like. The other computer components are the computer resources which are not being reallocated.

The resources of server 500 are divided by logical partitioning into first virtual system 502 and second virtual system 504. If at least one of the resources of first virtual system 502 exceeds the recipient load threshold and at least one of the resources of second virtual system 504 is below the donor load threshold, then second virtual system 504 will be eligible to donate a resource to first virtual system 502. By moving a resource such as resource 506 to first virtual system 502, resource 506 can be donated to first virtual system 502.

Figure 7:
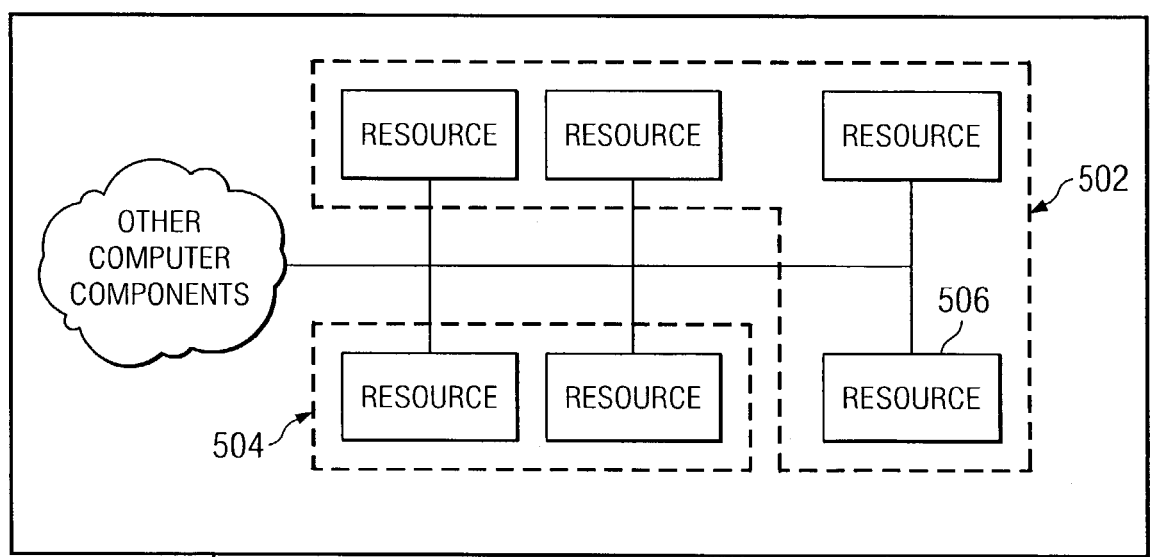
FIG. 7 is an illustration of a logically partitioned system in a single computer after application of the present invention.

Turning to FIG. 7, server 500 has been altered from the illustration in FIG. 6. In FIG. 7, resource 506 has been moved from second virtual system 504 to first virtual system 502 by PEP 200 of the present invention.

Figure 8:
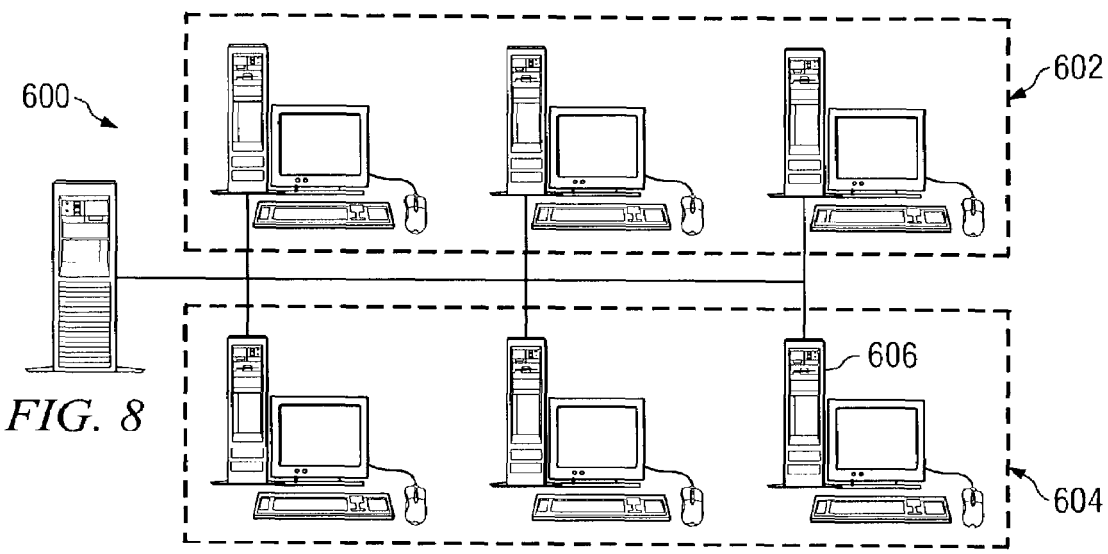
FIG. 8 is an illustration of a logically partitioned virtual system before application of the present invention.

The present invention is not limited in application to computer systems. PEP 200, RP 300, and/or HWP 400 may be implemented on a managed system which is a network of individual computers. Turning to FIG. 8, managed network 600 is divided by logical partitioning into first virtual network 602 and second virtual network 604. If at least one of the computers of first virtual network 602 exceeds the recipient load threshold and at least one of the computers of second virtual network 604 is below the donor load threshold, then second virtual network 604 will be eligible to donate a computer, and therefore a resource, to first virtual network 602. By moving a computer such as computer 606 to first virtual network 602, the resource of computer 606 can be donated to first virtual network 602.

Figure 9:
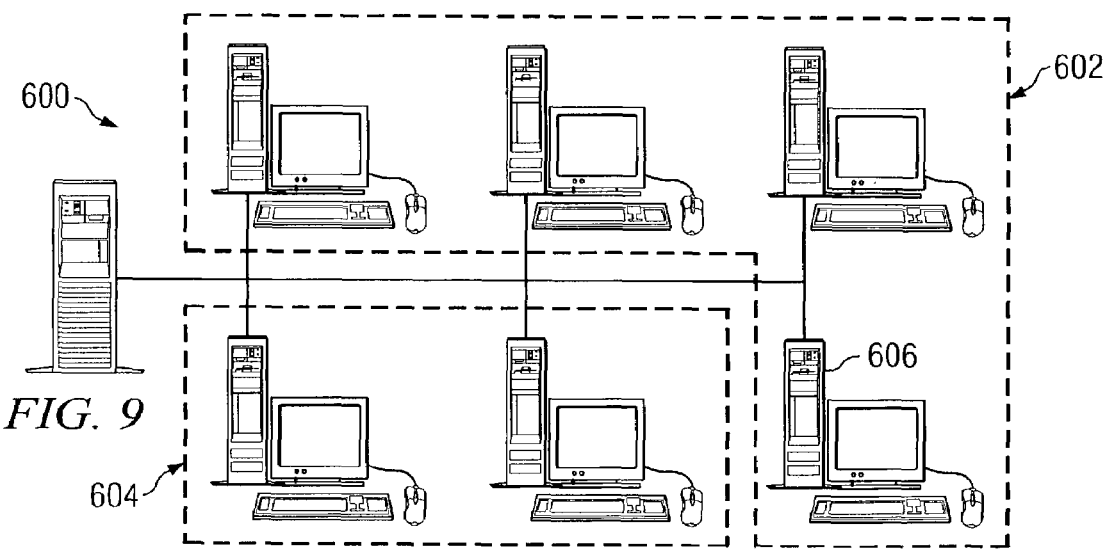
FIG. 9 is an illustration of a logically partitioned virtual system after application of the present invention.

Turning to FIG. 9, managed network 600 has been altered from the illustration in FIG. 8. In FIG. 9, computer 606 has been moved from second virtual network 604 to first virtual network 602 by PEP 200 of the present invention.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for automatically reallocating a resource in a plurality of computer systems, the plurality of computer systems having a most underutilized resource and a most burdened resource, comprising:

defining a donor load threshold as a specific performance parameter below which a donor may provide a resource;

defining a recipient load threshold as a specific performance parameter above which a recipient may receive a resource;

compiling a plurality of resource data for a plurality of donor candidates and a plurality of recipient candidates;

calculating a composite parameter by averaging the plurality of resource data over a sampling period;

defining a donor candidate as a computer system having a composite parameter less than the donor load threshold;

defining a recipient candidate as a computer system having a composite parameter greater than the recipient load threshold;

calculating a recipient workload ratio for each of the plurality of recipient candidates by dividing the composite parameter by the recipient load threshold;

calculating a donor workload ratio for each of the plurality of donor candidates by dividing the composite parameter by the donor load threshold;

ranking a plurality of donors based on the donor workload ratio;

ranking a plurality of recipients based on the recipient workload ratio; and reallocating a highest ranked donor to a highest ranked recipient;

wherein when the recipient workload ratio is greater than one, a recipient candidate is designated a recipient;

wherein when a donor workload ratio is less than one, a donor candidate is designated a donor;

wherein the most underutilized resource is reallocated to assist the most burdened resource.

2. The method of claim 1 further comprising:
comparing a plurality of donor workload ratios.

3. The method of claim 2 further comprising:
when the difference between two of the donor workload ratios is greater than a noise factor, ranking a donor with the lower workload ratio above a donor with the higher workload ratio.

4. The method of claim 2 further comprising:
when the difference between two of the donor workload ratios is not greater than a noise factor, ranking a donor with a lower priority resource above a donor with a higher priority resource.

5. The method of claim 1 further comprising:
comparing a plurality of recipient workload ratios.

6. The method of claim 5 further comprising:
when a difference between two of the recipient workload ratios is greater than a noise factor, ranking a recipient with the higher workload ratio above a recipient with the lower workload ratio.

7. The method of claim 5 further comprising:
when the difference between two of the recipient workload ratios is not greater than a noise factor, ranking a recipient with a higher priority resource above a recipient with a lower priority resource.

8. The method of claim 1 further comprising:
ranking at least one donor and at least one recipient based on the donor workload ratio and the recipient workload ratio; and
reallocating the resource from a highest ranked donor to a highest ranked recipient.

9. A method for automatically reallocating a resource in a plurality of computer systems, the plurality of computer systems having a most underutilized resource and a most burdened resource comprising:

calculating a donor workload ratio;

calculating a recipient workload ratio;

determining that a sampling window is a moving window or a discrete window;

when a donor workload ratio is greater than one, designating the resource as a donor;

when a recipient workload ratio is greater than one, designating the resource as a recipient;

when a sampling window is a moving window, discarding an oldest data sample and adding a newest data sample;

when reallocation of the resource is necessary reallocating a highest ranked donor to a highest ranked recipient;

wherein the most underutilized resource is reallocated to assist the most burdened resource.

10. The method of claim 9 wherein said hierarchical ranking comprises:
ranking a plurality of resources based on the resource workload ratio; and
reallocating the resource from a donor to a recipient based on the resource ranking.

11. The method of claim 9 wherein said hierarchical ranking further comprises:
comparing a plurality of donor workload ratios.

12. The method of claim 11 further comprising:
when a difference between two of the donor workload ratios is greater than a noise factor, ranking a donor with a lower workload ratio above a donor with a higher workload ratio.

13. The method of claim 11 further comprising:
when the difference between two of the donor workload ratios is greater than a noise factor, ranking a donor with a lower priority resource above a donor with a higher priority resource.

14. The method of claim 9 wherein said hierarchical ranking further comprises:
comparing a plurality of recipient workload ratios.

15. The method of claim 14 further comprising:
when a difference between two of the recipient workload ratios is greater than a noise factor, ranking a recipient with a higher workload ratio above a recipient with a lower workload ratio.

16. The method of claim 14 further comprising:
when the difference between two of the recipient workload ratios is not greater than a noise factor, ranking a recipient with a higher priority resource above a recipient with a lower priority resource.

17. The method of claim 9 wherein said hierarchical ranking further comprises:
ranking at least one donor and at least one recipient based on the donor workload ratio and the recipient workload ratio; and
reallocating the resource from a highest ranked donor to a highest ranked recipient.

18. A program product operable on a computer, the program product comprising:
a computer-usable medium;
wherein the computer usable medium comprises instructions for automatically reallocating a plurality of resources among a plurality of computer systems, the plurality of computer systems having a most underutilized resource and a most burdened resource, the instructions comprising:
instructions to define a donor load threshold as a specific performance parameter below which a donor may provide a resource;
instructions to define a recipient load threshold as a specific performance parameter above which a recipient may receive a resource;
instructions to compile a plurality of resource data for a plurality of donor candidates and a plurality of recipient candidates;
instructions to calculate a composite parameter by averaging the plurality of resource data over a sampling period;
instructions to define a donor candidate as a computer system having a composite parameter less than the donor load threshold;
instructions to define a recipient candidate as a computer system having a composite parameter greater than the recipient load threshold;
instructions to calculate a recipient workload ratio for each of the plurality of recipient candidates by dividing the composite parameter by the recipient load threshold;
instructions to calculate a donor workload ratio for each of the plurality of donor candidates by dividing the composite parameter by the donor load threshold;
instructions to rank a plurality of donors based on the donor workload ratio;
instructions to rank a plurality of recipients based on the recipient workload ratio;
instructions to reallocate a highest ranked donor to a highest ranked recipient;
wherein when the recipient workload ratio is greater than one, instructions to designate a recipient candidate as a recipient;
wherein when a donor workload ratio is less than one, instructions to designate a donor candidate as a donor; and
wherein the most underutilized resource is reallocated to assist the most burdened resource.

19. The program product of claim 18 further comprising:
instructions for comparing a plurality of donor workload ratios.

20. The program product of claim 19 further comprising:
instructions for determining when the difference between two of the donor workload ratios is greater than a noise factor; and
when the difference between two of the donor workload ratios is greater than the noise factor, instructions for ranking a donor with the lower workload ratio above a donor with the higher workload ratio.

21. The program product of claim 19 further comprising:
instructions for determining when the difference between two of the donor workload ratios is not greater than a noise factor; and
when the difference between two of the donor workload ratios is not greater than the noise factor, instructions for ranking a donor with a lower priority resource above a donor with a higher priority resource.

22. The program product of claim 18 further comprising:
instructions for comparing a plurality of recipient workload ratios.

23. The program product of claim 22 further comprising:
instructions for determining when the difference between two of the recipient workload ratios is greater than a noise factor; and
when the difference between two of the recipient workload ratios is greater than the noise factor, instructions for ranking a recipient with the higher workload ratio above a recipient with the lower workload ratio.

24. The program product of claim 22 further comprising:
instructions for determining when the difference between two of the recipient workload ratios is not greater than a noise factor; and
when the difference between two of the recipient workload ratios is not greater than the noise factor, instructions for ranking a recipient with a higher priority resource above a recipient with a lower priority resource.

25. The program product of claim 18 further comprising:
ranking at least one donor and at least one recipient based on the donor workload ratio and the recipient workload ratio; and reallocating the resource from a highest ranked donor to a highest ranked recipient.

26. A program product operable on a computer, the program product comprising:

a computer-usable medium;

wherein the computer usable medium containing instructions to automatically reallocate resources among a plurality of computer systems, the plurality of computer systems having a most underutilized resource and a most burdened resource, the instructions comprising:

instructions for calculating a donor workload ratio;

instructions for determining when a donor workload ratio is greater than one;

instructions for calculating a recipient workload ratio;

instructions for determining when a recipient workload ratio is greater than one;

instructions for determining that a sampling window is a moving window or a discrete window; and instructions for determining when reallocation of the resource is necessary;

wherein responsive to the determining that the donor workload ratio is greater than one, instructions for designating the resource as a donor;

wherein responsive to the determination that the recipient workload ratio is greater than one, instruction for designating the resource as a recipient;

wherein responsive to a determination that the sampling window is a moving window, instructions for discarding an oldest data sample and adding a newest data sample;

wherein responsive to the determination that reallocation is necessary, instructions for reallocating a highest ranked donor to a highest ranked recipient;

wherein the most underutilized resource is reallocated to assist the most burdened resource.

27. The program product of claim 26 further comprising:

instructions for determining when a sampling window is a moving window or a discrete window; and when the sampling window is a discrete window, instructions for discarding all the data samples and collecting new data samples.

28. The program product of claim 26 wherein said hierarchical ranking comprises:

instructions for ranking a plurality of resources based on the resource workload ratio; and instructions for reallocating the resource from a donor to a recipient based on the resource ranking.

29. The program product of claim 26 wherein said hierarchical ranking comprises:

instructions for comparing a plurality of donor workload ratios.

30. The program product of claim 29 further comprising:

instructions for determining when the difference between two of the donor workload ratios is greater than a noise factor; and when the difference between two of the donor workload ratios is greater than the noise factor, instructions for ranking a donor with the lower workload ratio above a donor with the higher workload ratio.

31. The program product of claim 29 further comprising:

instructions for determining when the difference between two of the donor workload ratios is not greater than a noise factor; and when the difference between two of the donor workload ratios is not greater than the noise factor, instructions for ranking a donor with a lower priority resource above a donor with a higher priority resource.

32. The program product of claim 26 wherein said hierarchical ranking comprises:

instructions for comparing a plurality of recipient workload ratios.

33. The program product of claim 32 further comprising:

instructions for determining when the difference between two of the recipient workload ratios is greater than a noise factor; and when the difference between two of the recipient workload ratios is greater than the noise factor, instructions for ranking a recipient with the higher workload ratio above a recipient with the lower workload ratio.

34. The program product of claim 32 further comprising:

instructions for determining when the difference between two of the recipient workload ratios is not greater than a noise factor; and when the difference between two of the recipient workload ratios is not greater than the noise factor, instructions for ranking a recipient with a higher priority resource above a recipient with a lower priority resource.

35. The program product of claim 26 wherein said hierarchical ranking comprises:

instructions for ranking at least one donor and at least one recipient based on the donor workload ratio and the recipient workload ratio; and instructions for reallocating the resource from a highest ranked donor to a highest ranked recipient.

* * * * *